United States Patent [19]

Kaneko et al.

[11] 4,362,791

[45] Dec. 7, 1982

[54] REDOX BATTERY

[75] Inventors: Hiroko Kaneko, Sakuramura; Ken Nozaki, Ibaragi, both of Japan

[73] Assignees: Agency of Industrial Science & Technology; Ministry of International Trade & Industry, both of Tokyo, Japan

[21] Appl. No.: 246,255

[22] Filed: Mar. 23, 1981

[30] Foreign Application Priority Data

Jun. 17, 1980 [JP] Japan .................................. 55-81940
Jun. 17, 1980 [JP] Japan .................................. 55-81941

[51] Int. Cl.³ ............................................ H01M 8/20
[52] U.S. Cl. .................................. 429/101; 429/109; 429/202
[58] Field of Search ................. 429/109, 101, 105, 15, 429/19, 27, 46, 202

[56] References Cited

U.S. PATENT DOCUMENTS

| | | | |
|---|---|---|---|
| 3,188,241 | 6/1965 | Weiss et al. | 429/15 |
| 3,540,933 | 11/1970 | Boeke | 429/19 |
| 3,540,934 | 11/1970 | Boeke | 429/101 X |
| 3,861,957 | 1/1975 | Koivisto | 429/109 X |
| 4,147,843 | 4/1979 | Hakkinen | 429/109 |
| 4,159,366 | 6/1979 | Thaller | 429/15 |
| 4,220,690 | 9/1980 | Blurton et al. | 429/15 |

Primary Examiner—Anthony Skapars
Attorney, Agent, or Firm—Oblon, Fisher, Spivak, McClelland & Maier

[57] ABSTRACT

In a redox battery using a titanium redox system or chromium redox system as an active material for the negative electrode or a manganese redox system as an active material for the positive electrode, the electromotive force of the battery and the stability of electrolyte solutions are enhanced by addition of a chelating agent such as citric acid or a complexing agent such as phosphoric acid to the redox system used therein.

5 Claims, 7 Drawing Figures

REDOX BATTERY

BACKGROUND OF THE INVENTION

This invention relates to a redox battery.

Since electric power can be readily converted into various forms of energy, easily controlled and safely consumed without entailing any environmental pollution, the proportion of the consumption of electric power to the total consumption of all forms of energy combined is increasing year after year. The supply of electric power has a unique characteristic in that the production of electric power and the consumption thereof take place substantially at the same time. The efforts devoted, despite this characteristic restriction, to ensuring reliable supply of electric power of high quality at a fixed frequency under a fixed voltage while promptly responding to incessantly changing power consumption, constitute one important task for those engaged in generation and supply of electric power. In the existing circumstances, nuclear power plants and powerful modern thermal power plants, which do not permit easy change of output but which exhibit highly efficient performance, are operated at their rated maximum capacities while, on the other hand, the hydroelectric power plants, which are capable of quickly responding to frequent fluctuations in power consumption, are operated with their outputs controlled to meet abrupt rises in power consumption during the daytime. The excess electric power which is generated during the nighttime by the nuclear power plants and powerful modern thermal power plants, both economical sources of power, is stored by being utilized to operate pumped-up storage power plants.

With the increasingly harsh topographical conditions of prospective sites for construction of pumped-up storage power plants, the possibility of a power storage system by use of secondary batteries has now become a subject of public discussion. Among secondary batteries existing today, the redox battery which has been developed as a power storage system capable of dispersed installation is worthy of special attention.

The redox batteries developed to date are divided into two types, the redox-flow type secondary batteries which involve storing an aqueous redox solution in a tank and charging or discharging the solution in a flow type electrolytic cell and the redox type fuel batteries. Both types have a common technical task in the sense that the redox system, i.e. an aqueous solution containing an ion with variable valencies as an energy source, is utilized in the form of a positive electrolyte or negative electrolyte. This task resides in the search for a stable redox ion which promises appropriate electromotive force, high solubility and low cost.

SUMMARY OF THE INVENTION

One object of this invention is to provide an inexpensive redox battery which possesses a relatively high electromotive force capable of being controlled at will.

To accomplish this object according to the present invention, there is provided a redox battery which uses a titanium redox system or chromium redox system as the negative electrolyte or a manganese redox system as the positive electrolyte respectively and adds to the redox system in use a specific complexing agent or chelating agent in an amount sufficient to shift the standard electrolytic potential existing in the absence of such agent toward the negative side when the redox system is of titanium or chromium type or in an amount sufficient to form a coordination compound of the trivalent manganese ion when the redox system is of manganese type.

By the addition of the specific complexing agent or chelating agent to the redox battery using either of the two types of redox systems, the titanium, chromium or manganese ion in the relevant redox system is converted into the corresponding complex or chelate ion to stabilize the solution, promote the reaction and enhance the electromotive force involved.

The other objects and characteristics of the present invention will become apparent from the further disclosure of the invention to be made hereinbelow with reference to the accompanying drawing.

DESCRIPTION OF THE PREFERRED EMBODIMENTS

Figure 1:
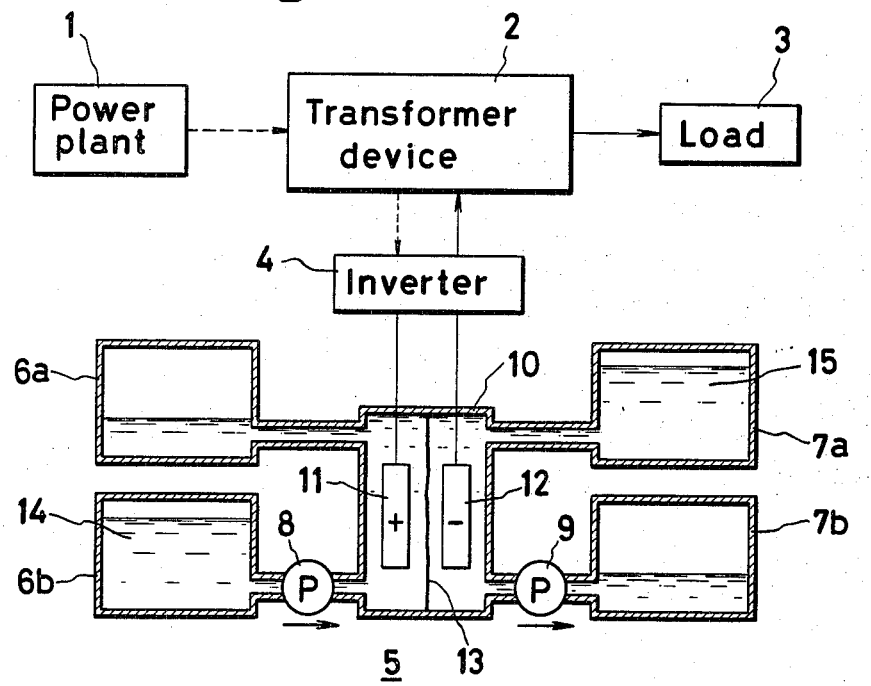
FIG. 1 is an explanatory diagram showing an electric power storage system using a redox battery in the process of electric charge.
Figure 2:
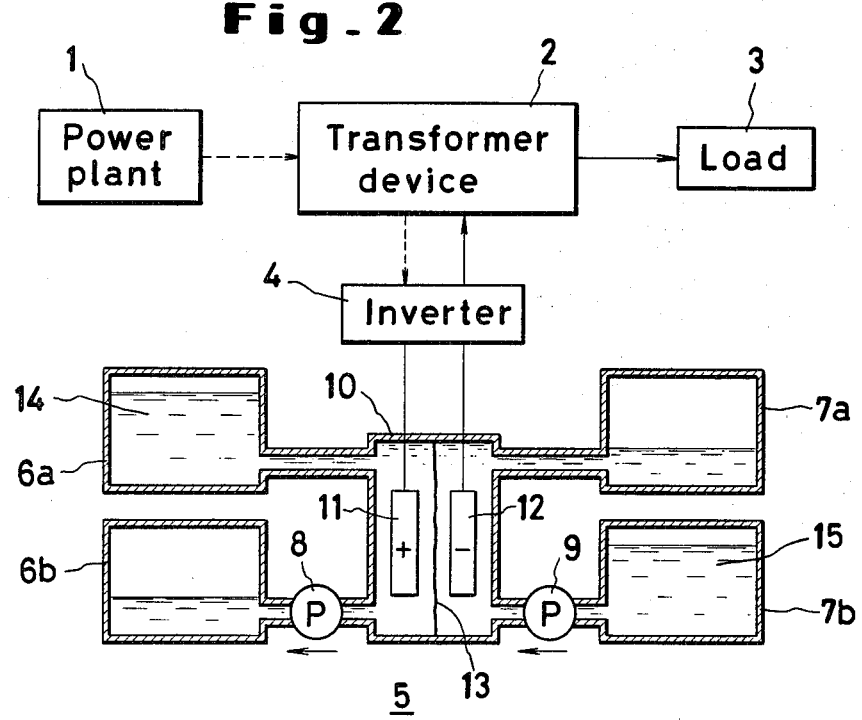
FIG. 2 is an explanatory diagram showing the electric power storage system using the redox battery in the process of electric discharge.

FIG. 1 is an explanatory diagram illustrating an electric power storage system using a redox-flow type secondary battery in the process of charge, and FIG. 2 is an explanatory diagram illustrating the same system in the process of discharge.

The electric power generated at a power plant 1 and transmitted to a transformer device 2 is transformed to a suitable voltage and supplied to a load 3.

When surplus electric power occurs in the nighttime, it is subjected to AC-DC conversion by an inverter 4 and the converted current is used to charge a redox battery 5. This redox battery 5 is composed of tanks 6a, 6b, 7a, 7b, pumps 8, 9 and a flow-type electrolytic cell 10. The flow-type electrolytic cell 10 is provided with a positive electrode 11, a negative electrode 12 and a diaphragm 13 serving to partition the intervening space between the two electrodes. The compartments partitioned by the diaphragm 13 are filled with a positive electrolyte 14 and a negative electrolyte 15. The positive electrolyte 14 is an aqueous hydrochloric acid solution containing Fe ion as the active material for the positive electrode and the negative electrolyte 15 is an aqueous hydrochloric acid solution containing Cr ion as the active material for the negative electrode. The charging of the redox battery is started by gradually delivering the positive electrolyte 14 from the tank 6b via the pump 8 to the tank 6a and the negative elctrolyte from the tank 7a via the pump 9 to the tank 7b respectively as illustrated in FIG. 1. Where Fe ion is used as the active material for the positive electrode in the positive electrolyte 14 and Cr ion as the active material for the negative electrode in the negative electrolyte 15, for example, the reactions which occur within the flow type electrolytic cell 10 are those of the following formulas, (1) through (3), which proceed in the directions of charge.

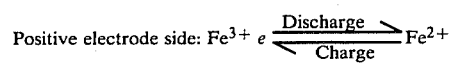

$$\text{Positive electrode side: } Fe^{3+} + e \underset{\text{Charge}}{\overset{\text{Discharge}}{\rightleftarrows}} Fe^{2+} \quad (1)$$

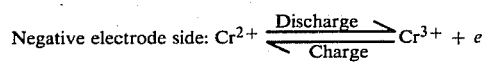

$$\text{Negative electrode side: } Cr^{2+} \underset{\text{Charge}}{\overset{\text{Discharge}}{\rightleftarrows}} Cr^{3+} + e \quad (2)$$

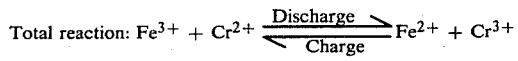

$$\text{Total reaction: } Fe^{3+} + Cr^{2+} \underset{\text{Charge}}{\overset{\text{Discharge}}{\rightleftarrows}} Fe^{2+} + Cr^{3+} \quad (3)$$

In consequence of the reactions mentioned above, the electric power is stored in the positive electrolyte 14 and the negative electrolyte 15. When the electric power supplied is surpassed by the electric power needed, the aforementioned reactions of the formulas (1) through (3) are caused to proceed in the directions of discharge, the inverter 4 is actuated to effect DC-AC conversion and the electric power is supplied through the transformer device 2 to the load 3.

The voltage of charge and discharge of the redox battery 5 is determined by the electromotive force (open circuit voltage) of the battery and the electromotive force is determined by the redox pair which combines the two redox systems in the form of positive electrolyte and negative electrolyte. A redox system which uses a fairly promising acidic aqueous solution will be described with reference to FIG. 3.

Figure 3:
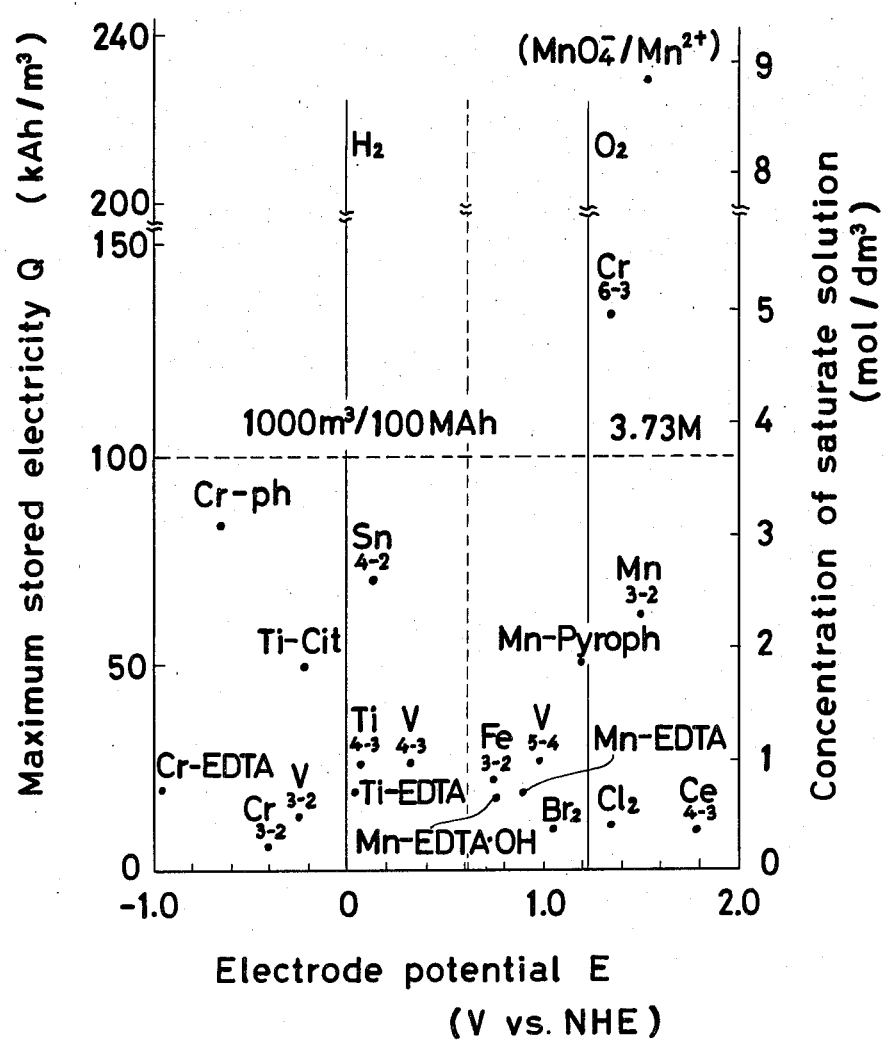
FIG. 3 is a graph showing the relation between the maximum stored electricity quantities of various redox systems and the electrode potentials possessed by the redox systems.

FIG. 3 is a graph showing the relation between the standard electrode potential E of a redox system indicated against the horizontal axis and the quantity of maximum stored electricity Q storable per unit volume of the corresponding redox solution calculated from the concentration in the saturated solution indicated against the vertical axis. (FIG. 3 compares various redox systems in sulfuric acid solutions.) The quantity of the maximum stored electric power (kWh/m$^3$) of a given aqueous solution containing a particular pair of two redox systems can be estimated by consulting this graph.

In the case of the pair of Ti and Mn redox systems, for example, the potential difference of about 1.2 V found against the horixontal axis represents the electrode potential and one half of the geometric average found to be about 23 kAh/m$^3$ against the vertical axis represents the quantity of maximum stored electricity. Thus, the energy density in this case can be estimated to be about 28 kWh/m$^3$ by multiplying the two values mentioned above. This energy density is substantially the same as that obtainable by the conventional lead battery. In FIG. 3, the two solid straight lines drawn perpendicularly to the horizontal axis at the points, E=O and 1.13

V, represent the equilibrium potentials for the generation of hydrogen gas and oxygen gas respectively in consequence of the electrolysis of water. Any redox system whose position in the graph heavily deviates outwardly from the two solid lines, therefore, proves impracticable because of excessive gas liberation. For this reason, the electromotive force of the redox battery cannot exceed 1.2 V to any appreciable extent. The dotted line drawn perpendicularly to the horizontal axis in the neighborhood of +0.6 V represents the medium point of the potential responsible for the aforementioned gas liberation. Any redox system whose position in the graph amply departs in either way from this dotted line, therefore, proves advantageous for the purpose of obtaining a large electromotive force. The positions of the various redox systems indicated in the graph may be notably varied by the kinds of the positive and negative electrolytes to be used, the pH values of the aqueous solutions involved, etc.

As described above, such redox systems as Cr, Ti, V and Sn are available as active materials for the negative electrode for use in the conventional redox batteries. These substances have demerits of their own; V is too expensive, Cr causes a slow redox reaction, and Ti and Sn are deficient in electromotive force.

The active materials for the positive electrode usable in the conventional redox batteries include such redox systems as Br$_2$, Cl$_2$ and V besides Mn. They are expensive or have a possibility of causing environmental pollution. While manganese is inexpensive and has no possibility of causing any environmental pollution, it lacks stability because trivalent manganese undergoes precipitation in the aqueous solution.

As an active material for the positive electrode for the redox battery, the manganese redox system is promising in terms of solubility and other electrolytic properties as well as economy. Nevertheless, it has a disadvantage that the trivalent manganese which is formed during the charge in the aqueous solution is instable and tends to produce a precipitate of manganese dioxide or what seems to be a hydration product thereof because of loss of equilibration, for example.

This invention has been conceived with a view to overcoming the disadvantages described above.

First, active materials for the negative electrode involved in this invention will be described. As the active material for the negative electrode, a Ti redox system or chromium redox system is used. By adding to the active material for the negative electrode such chelating agent or complexing agent as ethylene diamine tetraacetic acid (EDTA), citric acid or phosphoric acid which is capable of shifting the standard electrode potential toward the negative side from the position existing in the absence of the agent, there is produced Ti-EDTA, Ti-citric acid or chromium-phosphoric acid which goes to enhance the electromotive force of the redox battery.

In one experiment, a redox system using a negative electrolyte containing a Ti redox system as an active material for the positive electrode and citric acid as a chelating agent for addition to the negative electrolyte was tested for variation of potential, E, as the function of pH value. The results are shown in FIG. 4.

Figure 4:
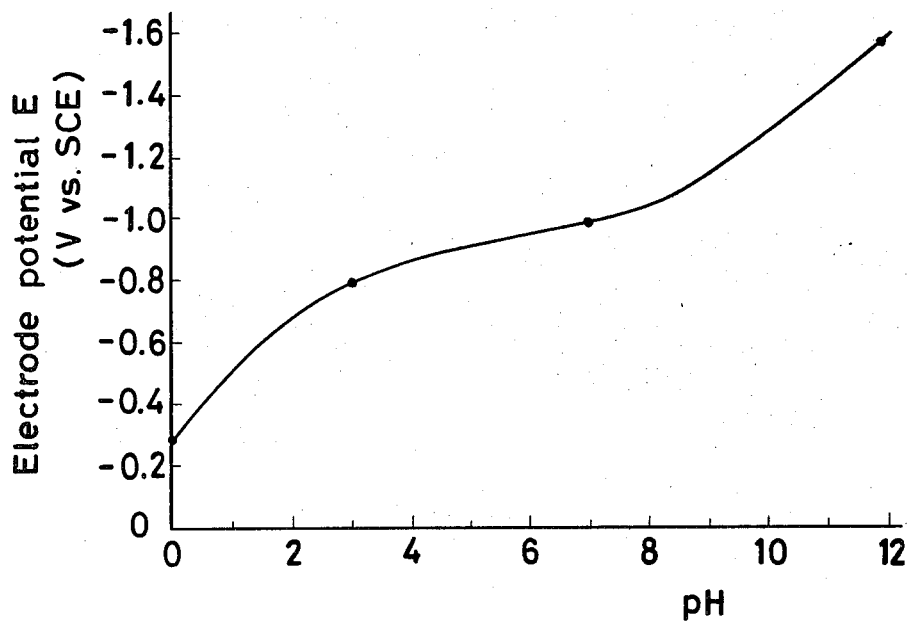
FIG. 4 is a graph showing the relation between the pH value and the electrode potential obtained by using citric acid as the chelating agent in a titanium redox system according to the present invention.

In the graph of FIG. 4, the horizontal axis indicates the pH value and the vertical axis the electrode potential E (V vs. SCE). From this graph, it is seen that the potential E is varied by the pH value. For the pH value of 0.5, the potential is $-0.4$ V vs. SCE ($-0.13$ vs.

NHE), which corresponds to the potential E for vanadium in FIG. 3. The variation of the potential E by the pH value is small when the pH value falls within the range of from 3 to 7. The value in this case is substantially fixed about −0.8 V vs. SCE (−0.53 V vs. NHE). This value corresponds to the potential E of chromium in FIG. 3. In this zone, the potential E is not appreciably affected by the pH value and the solubility is more than 2 mol/liter. All considered, this system proves advantageous from the practical point of view.

Figure 5:
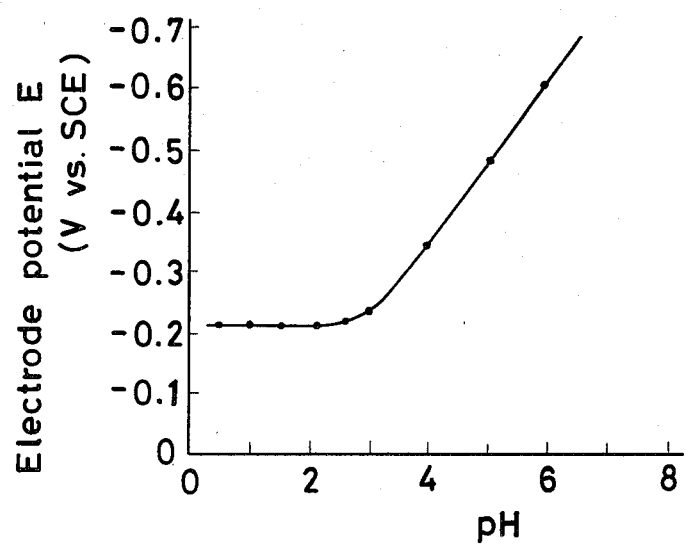
FIG. 5 is a graph showing the relation between the pH value and the electrode potential obtained by using ethylene diamine tetraacetate as the chelating agent in a titanium redox system according to the present invention.

The graph of FIG. 5 shows the variation curve of the electrode potential E caused by the pH of the solution in the operation of a redox battery using a Ti redox system and involving regulated addition of EDTA as a chelating agent to the redox system. It is seen from this graph that the electrode potential of the Ti redox system gives a constant potential of −0.21 V vs. SCE (−0.04 V vs. NHE) within the pH range of from 0.5 to 3.

The electrode reaction of the Ti-EDTA redox system is reversible, the variation of the potential E by the pH value is substantially absent when the pH value remains below 4, and the solution is prevented from precipitation by the chelation. Besides, the solubility is found to be slightly below 1 mol/liter, a value suggesting ample practicability of the redox system. In the operation mentioned above, the pH value is adjusted by using a 1 mol solution of acetic acid-sodium acetate as a buffer solution.

Figure 6:
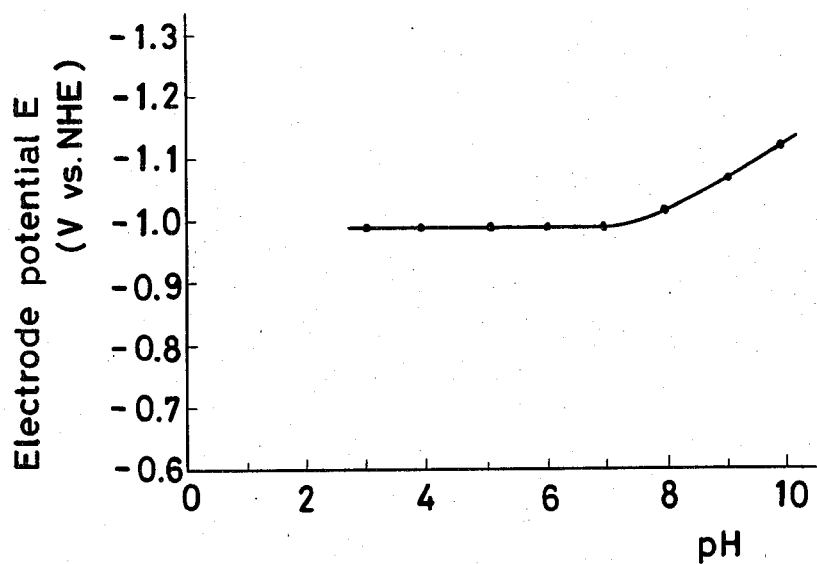
FIG. 6 is a graph showing the relation between the pH value and the electrode potential obtained by using ethylene diamine tetraacetate as the chelating agent in a chromium redox system according to the present invention.

The graph of FIG. 6 shows the variation curve of the electrode potential E caused by the pH of the solution in the operation of a redox battery using a Cr redox system and involving addition of EDTA as a chelating agent to the redox system.

Again in this case, as is seen from the graph, the electrode potential of the Cr redox system gives a constant potential of about −1.0 V vs. NHE within the pH range of from 3 to 7. This potential is shifted in the negative direction from that of Cr in FIG. 3, indicating that a sufficiently high electromotive force is obtained within the aforementioned pH range.

The desirability of the results of the operation of the redox battery by this invention increases in proportion as the concentration of the Ti redox system or Cr redox system to be used therein increases above the lower limit of 0.5 mol/liter. The working concentration of the redox system, therefore, is required to be suitably selected with due account taken of such factors as operational effects and economy.

When a chelating agent or a complexing agent is added as described above to the Ti redox system or Cr redox system to form a coordination compound, the titanium ion or chromium ion present in the system is stabilized by the action of the chelating agent or complexing agent and the redox potential is shifted toward the negative side. Consequently, the negative electrolyte is enabled to retain an appropriate potential. Further, the addition of the complexing agent to the ion of the redox system enables the aqueous solution of the redox system to assume weak acidity. This means that less care is needed in the selection of materials used for the construction of the battery.

Typical examples of the chelating agent to be usable for addition to the Ti redox system or Cr redox system of this invention are: polyamino-polycarboxilic acids having in one molecule thereof at least two amino-groups and at least two carboxylic acid-groups, such as EDTA, cyclohexane diamine tetraacetic acid, diethylene triamine pentaacetic acid, hydroxyethyl ethylene diamine triacetic acid, diaminopropane dioltetraacetic acid, methyl-EDTA, triethylene tetramine hexaacetic acid, glycolether diamine tetraacetic acid, ethylene diamine diacetic acid and ethylene diamine dipropionic acid; amino-polycarboxylic acids having in one molecule thereof one amino-group and at least two carboxylic acid-groups, such as nitrilo triacetic acid, dihydroxy ethylglycine, hydroxyethyliminodiacetic acid, iminodiacetic acid and nitrilotripropionic acid; aminocarboxylic acids having in one molecule thereof a single amino-group and a single carboxylic acid-group, such as glycine, glutamic acid, cysteine and alanine which are also called amino-acids; polycarboxylic acids having in one molecule thereof at least two caboxylic acid-groups, such as oxalic acid, malonic acid and succinic acid; hydroxy-polycarboxylic acids having in one molecule thereof a single OH-group and at least two carboxylic acid-groups, such as malic acid; polyhydroxycarboxylic acids having in one molecule thereof at least two OH-groups and a single carboxylic acid-group, such as glyceric acid and gluconic acid; polyhydroxy-polycarboxylic acids having in one molecule thereof at least two OH-groups and at least two carboxylic acid-groups, such as citric acid, tartaric acid and gluco-saccharic acid; salts of all preceding acids; polyhydricalcohols having in one molecule thereof at least two OH-groups, such as ethyleneglycol, glycerin and glucose; β-diketones having in one molecule thereof two ketone-groups, such as acetylacetone and cyclohexane; amines having in one molecule thereof at least one amino-group such as ethylene-diamine and ethanolamine and their salts; and poly-alcohol amines having in one molecule thereof a single amino-group and at least two OH-groups, such as ethanolamine and tri-ethanolamine.

Typical examples of the complexing agent usable in the present invention are: phosphoric acids such as ortho-phosphoric acid, monohydrogen-phosphoric acid, dihydrogen-phosphoric acid and phosphorous acid; organic acids, such as acetic acid, formic acid and lactic acid; inorganic acids, such as hydrochloric acid, thiocyanic acid and nitrous acid; salts of all preceding acids; polyphosphoric acids, such as pyro-phosphoric acid, meta-phosphoric acid and strong phosphoric acid; cyanides; and ammonium salts.

The chelating agents and complexing agents enumerated above may be used singly or in any desired combination to suit the occasion. The amount in which the agent(s) is used is solely governed by the requirement that it should suffice for shifting the standard electrode potential toward the negative side from the point existing in the absence of the agent. By the aforementioned amount is meant the amount of the complexing or chelating agent added to the solution in which amount no variation in redox potential occurs, i.e. the amount sufficient to complex or chelate all the amount of ion involved. If the amount is insufficient, there remains non-complexed or non-chelated ion and, due to the presence thereof, the current efficiency will be decreased. This amount is naturally variable more or less with the particular combination of the kind of complexing agent or chelating agent and the kind of redox system to be used. In the case of a system combining titanium ion and citric acid, for example, the amount of citric acid is required to be not less than two times the amount of titanium.

The proportions in which various chelating agents or complexing agents are added to various redox systems are indicated in the table below. The values 0.5, 1 and 2 shown therein represent the lower limits at which the added agents manifest their effects as expected. These effects increase in proportion as the added amounts increase above these lower limits.

| Kind of Chelating Agent As Ligand or Complexing Agent | Molar ratio per liter of Redox System | | |
|---|---|---|---|
| | Cr | Ti | Mn |
| Polyaminopolycarboxylic acid | 1 | 1 | 1 |
| aminopolycarboxylic acid | 1 | 1 | 1 |
| aminocarboxylic acid | 2 | 2 | 2 |
| polycarboxylic acid | 2 | 2 | 2 |
| hydroxypolycarboxylic acid | 2 | 2 | 2 |
| polyhydroxycarboxylic acid | 2 | 2 | 2 |
| polyhydroxypolycarboxylic acid | 2 | 2 | 2 |
| polyhydricalcohol | 2 | 2 | 2 |
| β-diketone | 1 | 1 | 1 |
| amine | 2 | 2 | 2 |
| polyalcoholamine | 2 | 2 | 2 |
| phosphoric acid | 0.5 | 0.5 | 0.5 |
| polyphosphoric acid | 0.5 | 0.5 | 0.5 |
| organic acid | 1 | 1 | 1 |
| inorganic acid | 2 | 2 | 2 |
| cyanide | 2 | 2 | 2 |
| ammonium salt | 2 | 2 | 2 |

By the addition of the aforementioned chelating agent or complexing agent, the manganese redox system being used as the active material for the positive electrode is allowed to remain stably in the solution without being precipitated in the form of a trivalent manganese compound. This means that while the manganese redox system is promising as an active material for the positive electrode from the standpoint of solubility and economy, the trivalent manganese ion which occurs in the aqueous solution in an electrically charged state is instable and tends to precipitate. For this reason, a chelating agent or complexing agent such as EDTA, pyro-phosphoric acid or acetic acid which is capable of chelating or complexing the trivalent manganese ion is added to the redox system to produce Mn-EDTA, Mn-pyrophosphoric acid or Mn-acetic acid and, accordingly, preclude otherwise possible precipitation of the trivalent manganese compound.

Figure 7:
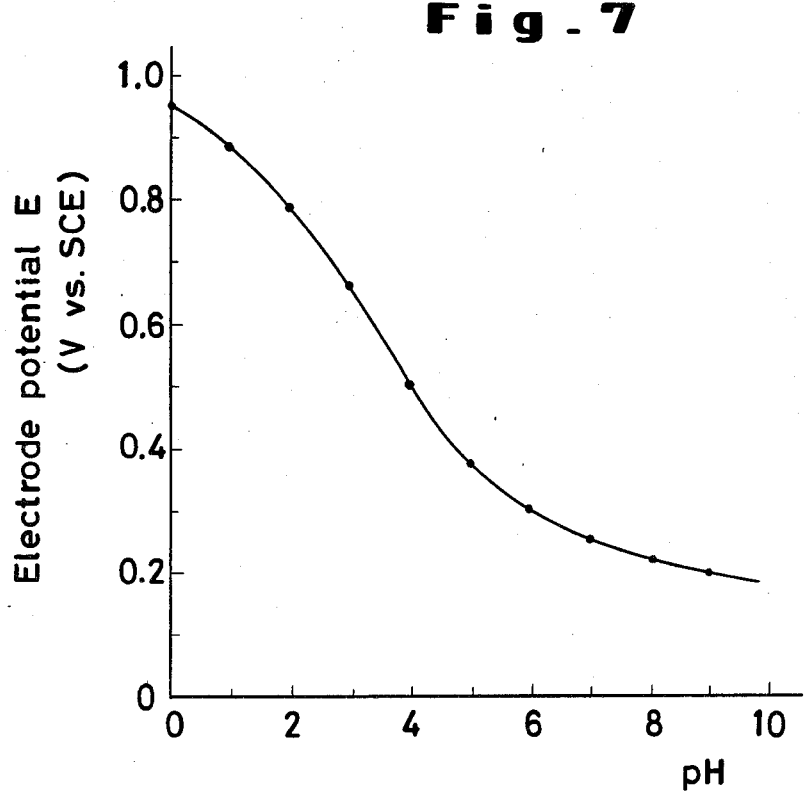
FIG. 7 is a graph showing the relation between the pH value and the electrode potential obtained by using pyro-phosphoric acid as the chelating agent in a manganese redox system according to the present invention.

The graph of FIG. 7 shows the variation curve of the electrode potential E by the pH of the solution in the operation of a redox battery using a manganese redox system as an active material for the positive electrode and involving addition of pyro-phosphoric acid as a chelating agent to the redox system. In the graph of FIG. 7, the horizontal axis indicates the pH value and the vertical axis the electrode potential E (V vs. SCE). From this graph, it is seen that the potential E is variable with the pH value. Where the pH value is 0, the potential E is +0.95 V vs. SCE (+1.2 V vs. NHE). This value is more toward the positive side than the potential E of the bromine-redox system indicated in FIG. 3, indicating that the loss of electromotive force by complexing is less. The amount of the maximum stored electricity of this redox system is large because the complexing effected by pyro-phosphoric acid stabilizes the solution and also because manganese-pyro-phosphoric acid has high solubility.

As the active material for the positive electrode, the manganese redox system is required to be present in a high concentration exceeding about 0.5 mol/liter.

As the chelating agent or complexing agent to be added to the manganese redox system for the prevention of the precipitation of manganese, the various chelating agents or complexing agents cited above can be used in their unmodified form. They may be used singly or in any desired combination.

The necessary amount of chelating agent or complexing agent added is variable with the kind of agent selected. This amount corresponds to the amount sufficient to complex or chelate all the amount of trivalent manganese ion. If the amount is sufficient for this purpose, the solution is kept transparent in a state wherein it contains no precipitate for a long period of time. Concrete examples of the necessary amounts are as shown in the aforementioned Table. In the case of EDTA, for example, the amount is required to be at least equal to the amount of manganese. In the case of phosphoric acid, the amount is required similarly to be equal to the amount of manganese.

As is clear from the description given above, a redox system having a large electromotive force can be obtained inexpensively by adding a specific complexing agent or chelating agent to the Ti redox system or Cr redox system contained as the active material for the negative electrode thereby shifting the standard electrode potential toward the negative side. By adding the aforementioned complexing agent or chelating agent to a Mn redox system contained as the active material for the positive electrode, the Mn redox system is stabilized to form an inexpensive redox battery of a relatively large electromotive force. Further, the addition of the aforementioned complexing agent or chelating agent enables the adjustment of the pH value of the system and consequently the control of the electromotive force of the battery. The redox batteries provided by the present invention, therefore, are expected to find extensive utility in application to not merely redox-flow type secondary batteries but also redox type fuel batteries. Needless to mention, this invention can be applied to batteries of a construction having a diaphragm interposed between a positive electrolyte containing an active material for the positive electrode and a negative electrolyte containing an active material for the negative electrode, a construction using a positive electrolyte containing an active material for the positive electrode and having placed in the positive electrolyte a negative electrode such as the Zn electrode which concurrently serves as an active material for the negative electrode, and a construction using a negative electrolyte containing an active material for the negative electrode and having placed in the negative electrolyte a positive electrode which concurrently serves as an active material for the positive electrode.

Now, the present invention will be described with reference to working examples below.

EXAMPLE 1

A negative electrolyte containing a Ti redox system as an active material for the negative electrode was prepared, and citric acid was added thereto. The pH value thereof was adjusted to 0.5 and the Ti-citric acid concentration thereof to about 1 mol/liter.

A positive electrolyte containing a sodium bromide-bromine redox system as an active material for the positive electrode was prepared. By addition of sulfuric acid thereto, the pH value thereof was adjusted to 0.5.

The resultant redox battery, when operated under the conditions of 1.3 V of electromotive force and 0.9 V of output voltage, produced a current density of about 10 mA/cm$^2$. The capacity of this battery for the maximum stored electric power was found to be 12 kWh/m$^3$.

EXAMPLE 2

A negative electrolyte containing a Ti redox system as an active material for the negative electrode was prepared, and EDTA was added thereto. The pH value thereof was adjusted to 3 and the Ti-EDTA concentration thereof to about 0.5 mol/liter.

A positive electrolyte containing the same system as used in Example 1 was prepared. There was obtained an electromotive force of 1 V. The capacity of the redox battery for the maximum stored electric power was 7 kWh/m$^3$.

EXAMPLE 3

A negative electrolyte containing a Cr redox system as an active material for the negative electrode was prepared, and EDTA was added thereto. The pH value thereof was adjusted to 3 and the Cr-EDTA concentration to about 0.5 mol/liter.

A positive electrolyte containing the same system as used in Example 1 was prepared. There was obtained an electromotive force of about 2 V. The capacity of the redox battery for the maximum stored electric power was 14 kWh/m$^3$.

EXAMPLE 4

An aqueous solution containing a Cr redox system as an active material for the negative electrode was prepared, and phosphoric acid was added thereto. The pH value thereof was adjusted to 2.0 and the Cr-phosphoric acid concentration thereof to 2 mol/liter.

A positive electrolyte containing the same system as used in Example 1 was prepared. There was obtained an electromotive force of about 1.7 V. The capacity of the redox battery for the maximum stored electric power was 24 kWh/m$^3$.

EXAMPLE 5

A positive electrolyte containing a Mn redox system as an active material for the positive electrode was prepared, and pyro-phosphoric acid was added thereto. The pH value thereof was adjusted to 0.5 and the manganese-pyro-phosphoric acid concentration thereof to 1 mol/liter. The pyro-phosphoric acid was added in a large excess relative to the amount of manganese.

A negative electrolyte containing a Cr-phosphoric acid redox system as an active material for the negative electrode was prepared. The pH value thereof was adjusted to 0.5.

The redox battery so obtained had no noticeable problem from the practical point of view because it had an electromotive force of 1.8 V and it permitted use of one same complexing agent for the fixed pH value. The capacity of the redox battery for the maximum stored electric power was 55 kWh/m$^3$.

EXAMPLE 6

A positive electrolyte containing a Mn redox system as an active material for the positive electrode was prepared, and EDTA was added thereto. The pH value thereof was adjusted to 3 and the Mn-EDTA concentration thereof to about 0.5 mol/liter.

A negative electrolyte containing a Ti-citric acid redox system as an active material for the negative electrode was prepared. By addition thereto of sodium citrate, the pH value was adjusted to 3.

The redox battery so obtained had an electromotive force of about 1.4 V and exhibited satisfactory charging and discharging reactions. The capacity of the redox battery for the maximum stored electric power was 17 kWh/m$^3$.

EXAMPLE 7

A positive electrolyte containing a Mn redox system as an active material for the positive electrode was prepared, and hydroxyethyl-ethylene diamine triacetate (EDTA·OH) was added thereto. By addition thereto of an acetic acid-sodium acetate buffer solution, the pH value thereof was adjusted to 3 and the Mn-EDTA·OH concentration thereof to about 0.5 mol/liter.

The same negative electrolyte as used in Example 6 was prepared. The results obtained by the operation of the redox battery were substantially the same as those of Example 6.

EXAMPLE 8

In a bromine-titanium redox type fuel cell, citric acid more than 2 mol/liter was added to 1 mol/liter titanium redox system to give a titanium-citric acid concentration of about 1 mol/liter. Consequently, the electromotive force of the fuel cell rose from 0.9 V to 1.3 V and the capacity of the maximum stored electric power rose from 8 to 13 kWh/m$^3$. Oxygen was used for the regeneration of the positive electrolyte using bromine as an active material and hydrogen was used for the regeneration of a negative electrolyte using titanium-citric acid.

EXAMPLE 9

A solution containing a Mn redox system as an active material for the positive electrode was prepared. Phosphoric acid was added thereto to a phosphoric acid concentration of about 2 mol/liter. The pH value of the resultant solution was adjusted to 1.0. A negative electrolyte containing the same Cr-phosphoric acid redox system as used in Example 5 was prepared.

By the combination of the electrolytes described above, there was obtained a redox battery which showed about 1.7 V of electromotive force, 80% of charge-discharge effect and about 43 kWh/m$^3$ of capacity for the maximum stored electric power. When a redox battery was constructed by following the same procedure except that pyro-phosphoric acid was used in place of phosphoric acid, the results of the operation of this redox battery were substantially the same as those indicated above.

EXAMPLE 10

A redox battery was produced by using, as an active material for the negative electrode, a Ti-EDTA redox system chelated with EDTA and, as an active material for the positive electrode, a Mn-EDTA redox system chelated with EDTA. An acetic acid-sodium acetate buffer solution was added to each of the redox systems thereby adjusting the pH values thereof to 4 and the Ti-EDTA and Mn-EDTA concentrations to 0.5 mol/liter or more.

This redox battery showed 1.1 V of electromotive force. When it was operated under the condition of 1.1 V of output voltage, there were obtained about 15 mA/cm$^2$ of current density, 80% of charge-discharge efficiency and about 11 kWh/m$^3$ of capacity for the maximum stored electric power.

What is claimed is:

1. A redox battery comprising an anode, an anode chamber containing an anode electrolyte, a cathode and a cathode chamber containing a cathode electrolyte, said anode electrolyte and said cathode electrolyte each containing a redox couple, wherein said redox couple in said anode electrolyte is a Mn 3-2 redox couple and said anode electrolyte contains at least a stoichiometric amount of a complexing agent or chelating agent whereby the standard electrode potential of said redox couple in said anode electrolyte is shifted to a more negative value.

2. A redox battery comprising an anode, an anode chamber containing an anode electrolyte, a cathode and a cathode chamber containing a cathode electrolyte, said anode electrolyte and said cathode electrolyte each containing a redox couple, wherein said redox couple in said anode electrolyte is a Mn 3-2 redox couple and said anode electrolyte contains at least a stoichiometric amount of a complexing agent or chelating agent whereby said Mn 3-2 redox couple is stabilized against precipitation.

3. The redox battery of claim 1 or claim 2 wherein said complexing agent or chelating agent is selected from the group consisting of pyrophosphoric acid, EDTA, acetic acid and hydroxyethylethylenediaminetriacetic acid.

4. A redox battery comprising an anode, an anode chamber containing an anode electrolyte, a cathode and a cathode chamber containing a cathode electrolyte, said anode electrolyte and said cathode electrolyte each containing a redox couple, wherein said redox couple in said cathode electrolyte is selected from the group consisting of Ti 4-3 and Cr 3-2 and said cathode electrolyte contains at least a stoichiometric amount of a complexing agent or chelating agent whereby the standard electrode potential of said redox couple in said cathode electrolyte is shifted to a more negative value.

5. The redox battery of claim 4 wherein said complexing or chelating agent is selected from the group consisting of citric acid, EDTA, and phosphoric acid.

* * * * *